US008416368B2

(12) United States Patent
Kaluzhny

(10) Patent No.: US 8,416,368 B2
(45) Date of Patent: Apr. 9, 2013

(54) EDGE ILLUMINATION OF BEZELLESS DISPLAY SCREEN

(75) Inventor: Mikhail Kaluzhny, Newton, MA (US)

(73) Assignee: Prysm, Inc., San Jose, CA (US)

( * ) Notice: Subject to any disclaimer, the term of this patent is extended or adjusted under 35 U.S.C. 154(b) by 711 days.

(21) Appl. No.: 12/573,677

(22) Filed: Oct. 5, 2009

(65) Prior Publication Data

US 2011/0080723 A1   Apr. 7, 2011

(51) Int. Cl.
*G02F 1/133* (2006.01)
*G02F 1/1333* (2006.01)
*G02F 1/1335* (2006.01)
*F21V 7/04* (2006.01)

(52) U.S. Cl.
USPC ............. 349/73; 349/58; 349/61; 362/632; 362/633

(58) Field of Classification Search .............. 349/58, 349/61, 73; 362/632–634
See application file for complete search history.

(56) References Cited

U.S. PATENT DOCUMENTS

| | | | |
|---|---|---|---|
| 2,439,181 A | 5/1946 | Nicoll | |
| 4,737,840 A * | 4/1988 | Morishita | 348/59 |
| 2001/0046007 A1 * | 11/2001 | Greene et al. | 349/73 |
| 2002/0024495 A1 | 2/2002 | Lippert et al. | |
| 2002/0118321 A1 * | 8/2002 | Ge | 349/73 |
| 2004/0223100 A1 | 11/2004 | Kotchick et al. | |
| 2008/0174515 A1 | 7/2008 | Matthies et al. | |

OTHER PUBLICATIONS

International Search Report, PCT Appl. No. PCT/US10/51331, dated Dec. 2, 2010.

* cited by examiner

*Primary Examiner* — Nathanael R Briggs
(74) *Attorney, Agent, or Firm* — Patterson & Sheridan, LLP

(57) ABSTRACT

One or more embodiments of the invention provide an apparatus and method for producing an image on a display screen that extends to the pixels or image elements disposed at the edge of the display screen. The display screen has an optical element with a thickness and an index of refraction that are selected to direct light to pixels or image elements disposed at the edge of the display screen without passing through the portion of the optical element that is blocked by a support frame or other structural member disposed on the rear surface of the display screen. Positioning such display screens together into a single screen assembly produces a tiled display having a much less noticeable grid pattern visible to the viewer.

24 Claims, 9 Drawing Sheets

EDGE ILLUMINATION OF BEZELLESS DISPLAY SCREEN

BACKGROUND OF THE INVENTION

1. Field of the Invention

Embodiments of the present invention generally relate to a display screen used to display an image, and more specifically, a multi-panel display system that is adapted to display images to a large number of viewers.

2. Description of the Related Art

Electronic display systems are commonly used to display information from computers and other sources. Typical display systems range in size from small displays used in mobile devices to very large displays that are used to display images to thousands of viewers at one time. Tiled display walls provide a large-format environment for presenting large high-resolution images by synchronizing and coupling together the output from multiple distinct imaging systems. Such large displays may be created by tiling a plurality of smaller display devices together. For example, the video walls frequently seen in the electronic media typically use multiple display modules, such as flat-panel displays, which are tiled to create such large displays.

One issue with tiled displays is that the gap present between the constituent display modules can produce a grid pattern visible to the viewer. FIG. 1A is a schematic plan view of a tiled display device 100 that has an array of display modules 102 that are each used to display portions of an image 107. In this configuration, the array of display modules 102 forms a grid pattern 101 found within the displayed image 107. FIG. 1B is a schematic perspective view of the tiled display device 100 that further illustrates the grid pattern 101 that may be visible to the viewer. Grid pattern 101 may be formed by a frame, bezel, or unilluminated peripheral region circumscribing each of the display modules 102, and/or by the gap 103 present between adjacent display modules 102. The presence of a noticeable grid pattern in a display device 100, such as grid pattern 101, can be distracting for extended periods of viewing by a viewer. In order for tiled display device 100 to produce a uniform display, free of visible grid pattern 101, it is important to reduce the space between the pixels found at the edge of each of the adjacent display modules 102 to minimize the un-illuminated region formed between the displayed images. Thus, the size of any gap 103, bezel, or unilluminated peripheral region between the formed images in each of the adjacent display modules 102 should be minimized.

As the foregoing illustrates, there is a need in the art for a tiled display device having a little or no noticeable grid pattern visible between adjacent display modules to improve the quality of the displayed image and improve the viewer's visual experience.

SUMMARY OF THE INVENTION

One or more embodiments of the invention provide an apparatus and method for producing an image on a display screen that extends to the pixels or image elements disposed at the edge of the display screen. Positioning such display screens together into a single screen assembly produces a tiled display having a much less noticeable grid pattern visible to the viewer. This is particularly true when each of the display screens is configured without a bezel or other support frame disposed around the screen perimeter.

According to one embodiment, a display screen comprises a screen assembly comprising an optical element having a first surface, a second surface, a first edge and an index of refraction, a monochromatic light source assembly that is positioned to direct a first light beam delivered from a first light beam source to a first position on the first surface, and a support frame having a support surface that is disposed over a shadow region on the first surface of the optical element, wherein a portion of the shadow region is disposed between the first position and the first edge of the optical element, wherein the index of refraction and the thickness of the optical element between the first and second surfaces are selected to direct the first light beam from the first position to a second position on the second surface of the optical element, and a portion of the first light beam passing through the optical element between the first position and the second position passes under at least a portion of the shadow region.

According to another embodiment, a method of forming a device that is adapted to display an image comprises positioning a supporting surface of a support frame over an optical element, wherein the supporting surface is positioned adjacent to a first surface of the optical element, and aligning a first light beam to a first position on the first surface so that the first light beam exits the optical element at a second position on a second surface of the optical element, wherein an index of refraction and a thickness of the optical element between the first and second surfaces and the first position are selected so that at least a portion of the first light beam extending between the first and second positions passes beneath the supporting surface.

According to another embodiment, a method of displaying an image comprises delivering a first light beam to a first position on a first surface of an optical element so that the first light beam exits the optical element at a second position on a second surface, wherein the first light beam exiting the second surface at the second position is configured to illuminate at least a portion of a light emitting layer disposed on an image surface of a screen that is positioned adjacent to the second surface, wherein the index of refraction and the thickness of the optical element between the first and second surfaces and first position are selected so that the portion of the light emitting layer is a portion of a pixel disposed at an edge of the screen.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

To minimize noticeable gridlines between display screens making up a tiled display, each display screen may be configured with a bezelless support frame mounted to a portion of the rear, i.e., non-visible, surface of the screen. Typically, the bezelless support frame is disposed at the periphery of the screen. Without a conventional frame or bezel circumscribing the edges of each of the constituent display screens of the tiled display, each of the display screens may be positioned in close proximity to each other with little or no gap present therebetween. Such an approach is described in greater detail in U.S. patent application Ser. No. 12/493,128, filed Jun. 26, 2009, and now issued as U.S. Pat. No. 8,258,685, which is incorporated by reference in its entirety where not inconsistent with the disclosure herein. However, because the bezelless display screens must be supported, a rear-mounted support frame will generally cover a portion of the rear surface of each screen that makes the generation of an image on the entire screen surface, i.e., from edge to edge, problematic. Embodiments of the invention contemplate methods and an apparatus that allow complete illumination of the image-display surface of such a display screen despite the presence of a light-blocking support frame mounted on portions of the rear surface of the screen. Namely, embodiments of the invention contemplate a screen having an optical element with a thickness and an index of refraction that are selected together to direct light to pixels or image elements disposed at the edge of the screen that are at least partially covered by portions of the support frame or other structural member.

Figure 2:
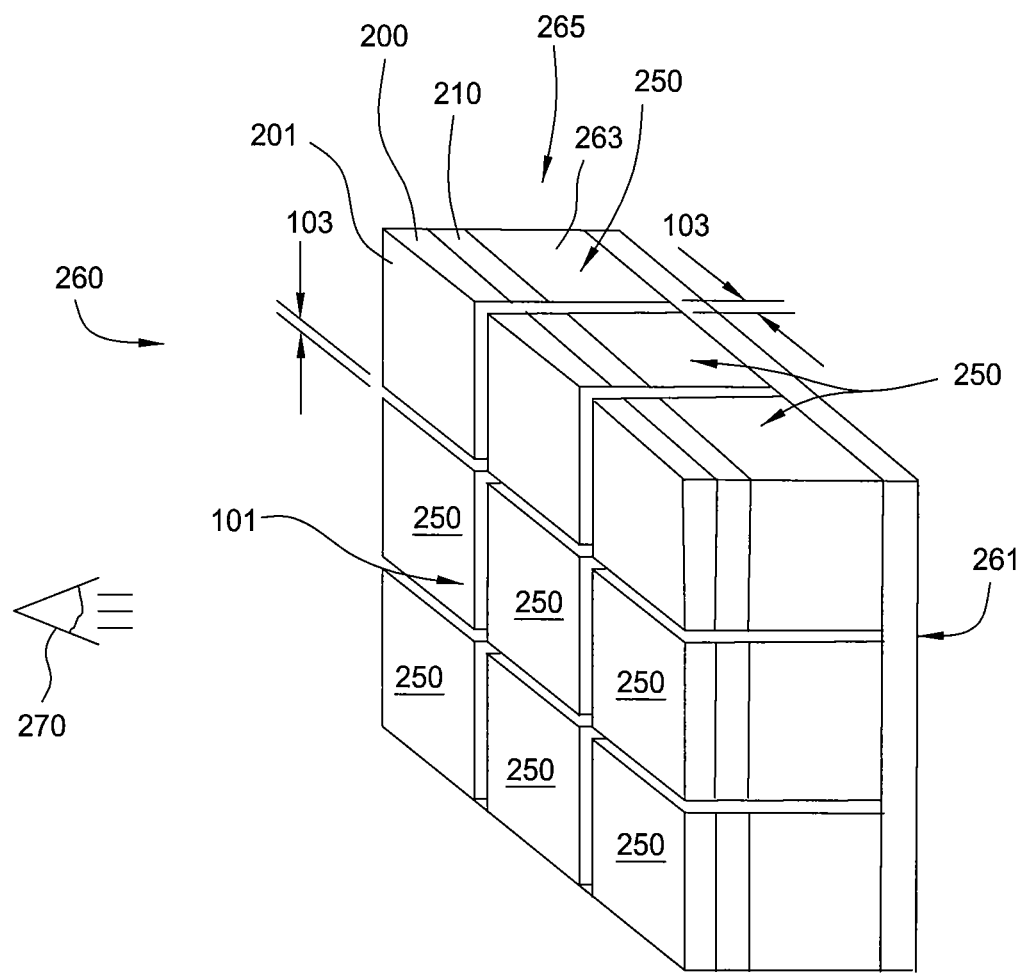
FIG. 2 illustrates one example of a three-by-three tiled display device that has less noticeable gridlines when viewed by a viewer, according to embodiments of the invention.

FIG. 2 illustrates one example of a three-by-three tiled display device 260 that has less noticeable gridlines when viewed by a viewer, according to embodiments of the invention. Tiled display device 260 includes a plurality of panel assemblies 250 and a display frame 261. The display frame 261 is generally a structural component, such as a plurality of racks, frames or other similar devices that are used to support the panel assemblies 250 in a desirable alignment and pattern. The panel assemblies 250 may be bolted, glued, or otherwise joined to the display frame 261 so that the requisite structural rigidity and alignment is achieved to provide a uniform image.

Each of the panel assemblies 250 generally comprises a screen 200 and support assembly 265. Support assembly 265 generally contains the electronic components and structural elements that are able to support screen 200 and, in combination with screen 200, deliver an image to an audience 270 that are positioned to view the viewing surface 201 of the panel assembly 250. Support assembly 265 comprises a support frame 210 that is part of, or connected to, an enclosure 263. Enclosure 263 generally supports and encloses the various electronic components and other devices that enable the formation of an image on a viewing surface 201 of screen 200, including a light source, projection optics, etc. In one embodiment, a light source projects light onto screen 200 through an internal region of enclosure 263 that comprises air at atmospheric pressure, as opposed to through a vacuum environment. In one embodiment, the pixels or image elements disposed at the edge(s) of the screen 200 are used to produce an image on viewing surface 201 that is fully illuminated edge to edge, and no portion of viewing surface 201 is shadowed by the support frame 210. In this way, an image is delivered to audience 270 that has significantly less noticeable gridlines when viewed by a viewer. An apparatus for fully illuminating viewing surface 201 is described below in conjunction with FIGS. 3A-C.

Figure 3A:
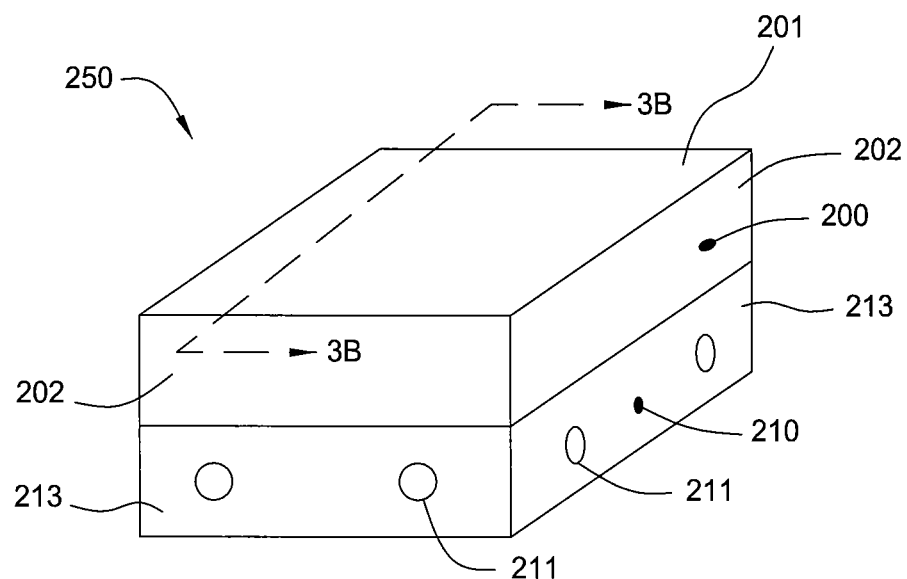
FIG. 3A is a schematic perspective view of a panel assembly that includes a display screen secured to a support frame, according to an embodiment of the invention.

FIG. 3A is a schematic perspective view of a panel assembly 250 that includes a screen 200 secured to a support frame 210, according to an embodiment of the invention. Screen 200 is a display screen that generally comprises a viewing surface 201 and one or more screen edges 202, and is illuminated by one or more light sources disposed in enclosure 263. In one embodiment, panel assembly 250 is a laser-based display system, which is further described below. Other configurations of panel assembly 250 that illuminate viewing surface 201 with one or more light sources disposed in enclosure 263 may also benefit from embodiments of the invention described herein. Support frame 210 is generally a rigid support member that is configured to support and allow screen 200 to be precisely positioned relative to the illumination-generating components positioned within enclosure 263 and relative to other screens 200 in the adjacent panel assemblies 250. In one embodiment of panel assembly 250, support frame 210 provides a means by which screen 200 can be fastened to other similar display screens to form a tiled display device 260. To that end, according to one embodiment, support frame 210 includes through-holes 211 or other means for securing support frame 210 to other similar support frames making up a display screen assembly 260.

Figure 3B:
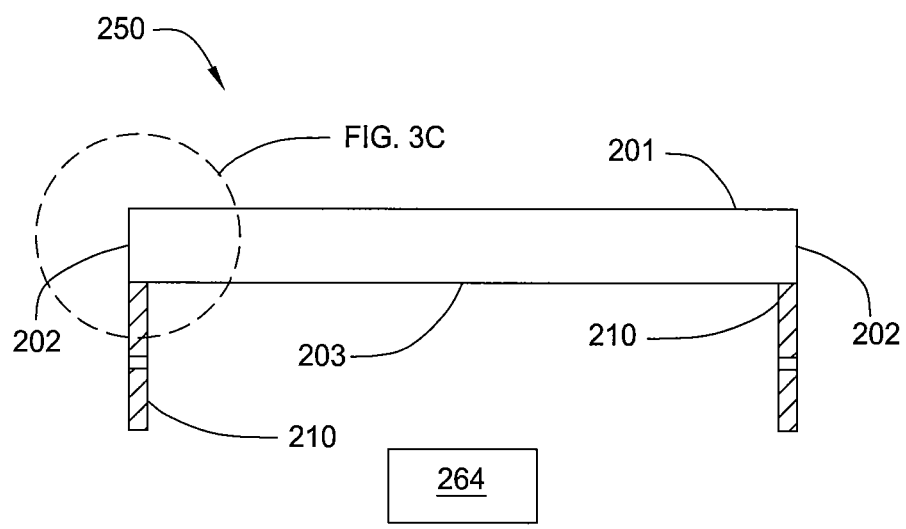
FIG. 3B is a schematic side cross-sectional view of a display screen and a support frame taken at section line 3B-3B in FIG. 3A.

FIG. 3B is a schematic side view of screen 200 and support frame 210 taken along the section line 3B-3B in FIG. 3A. As shown, support frame 210 is disposed on and mounted to the rear surface 203 of screen 200. Because support frame 210 positions screen 200 relative to enclosure 263, and is therefore disposed therebetween, support frame 210 may partially or completely block light that is directed to peripheral portions of viewing surface 201 from a light source assembly 264 positioned within enclosure 263. Such shadowing is described below in conjunction with FIG. 3C. In one embodiment, light source assembly 264 may be a monochromatic light source, i.e., a single wavelength light source, such as a semiconductor-based light source, and is directed to screen 200 to excite phosphor-containing regions in an image layer to produce an image. In one embodiment, light source assembly 264 may be a laser or other coherent, single wavelength light source. In one configuration, the monochromatic light source delivers a beam of electromagnetic radiation that is scanned across regions of the screen 200. For purposes of description, aspects of the invention are described herein in terms of panel assembly 250 being a laser-based display system. To that end, screen 200 is described below to include a plurality of phosphor regions formed on an image layer 266 thereof (shown in FIG. 3C), and light source assembly 264 is described as a laser module. However, one of skill in the art will appreciate that other designs for panel assembly 250 may also benefit from embodiments of the invention described herein, i.e., any designs in which the presence of support frame 210 may affect the uniformity or completeness of illumination of viewing surface 201 due to shadowing. Thus, in other embodiments, a light source assembly other than a laser module may be included in panel assembly 250 and screen 200 may use other than phosphor regions to produce an image. In one embodiment, light source assembly 264 is adapted to emit electromagnetic radiation in the blue, UV or IR wavelengths of light.

Figure 3C:
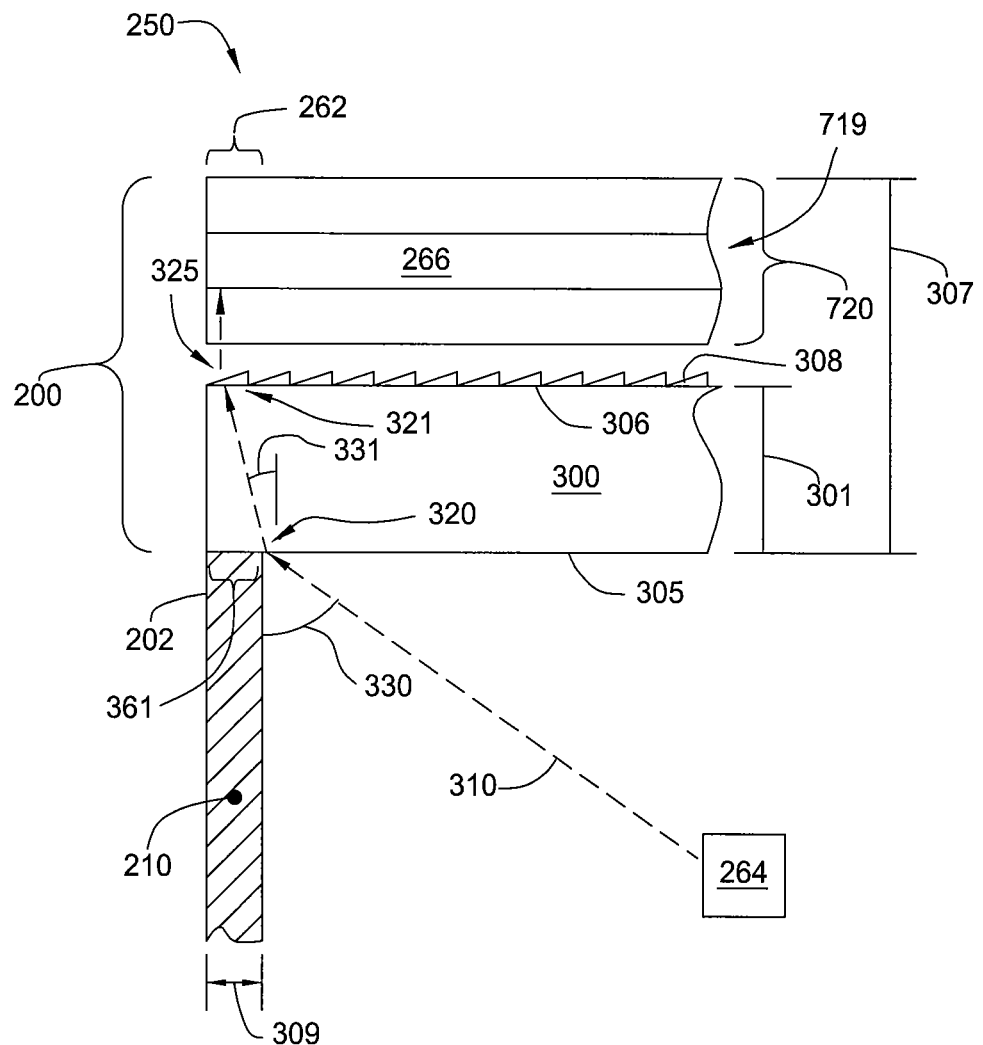
FIG. 3C is an expanded view of a region of a panel assembly, illustrating the area of contact between a support frame and a screen, according to an embodiment of the invention.

FIG. 3C is an expanded view of the region of panel assembly 250 indicated in FIG. 3B, illustrating the area of contact between support frame 210 and screen 200. Support frame 210 is disposed on rear surface 203 of screen 200, forming a shadow region 361 thereon, as shown. As part of laser-based display system, screen 200 may include an RGB assembly 720 separated from an optical element 300 by an air gap 325. RGB assembly 720 includes an image layer 266 and is described in greater detail below in conjunction with FIG. 7. The desired support frame thickness 309 for support frame 210 depends on a number of factors, including weight of screen 200, material used to manufacture the support frame 210, the desired stiffness of support frame 210, and the allowable manufacturing tolerances of the support frame 210 used to facilitate assembly of multiple panel assemblies 250 into a tiled display device 260. One of skill in the art can readily determine the requisite frame thickness 309 for a particular screen 200. In one embodiment, support frame 201 size is formed from a metal material and has a thickness 309 of about 1 mm, which is adequate to support screen 200 that has a mass of approximately 1-5 kg, and viewing surface 201 that is approximately 500 mm×400 mm.

It is generally desirable for excitation light from light source assembly 264 to be substantially perpendicular to image layer 266 found in screen 200. However, if excitation light is directed perpendicular to viewing surface 201 from light source assembly 264, any pixels or image elements that are disposed in peripheral region 262 (FIG. 3C) of image layer 266 will not be illuminated due to the shadowing effect caused by the screen supporting surface of support frame 210, which prevents light from light source assembly 264 from passing through shadow region 361. Consequently, a region of image layer 266 as wide as 1 mm or more may be formed at the perimeter of screen 200 that is un-illuminated, and a more noticeable gridline effect will result around said perimeter. Embodiments of the invention contemplate screen 200 having optical element 300 with a thickness 301 and an index of refraction that are selected together to direct light to pixels or image elements disposed in peripheral region 262 without passing through shadow region 361. Thus, such an embodiment allows the entire viewing surface 201 to be illuminated by light source assembly 264, even though support frame 210 prevents light from passing through shadow region 361.

Optical element 300 may be glass, plastic, or any other material that is substantially transparent to the wavelength, or wavelengths, of light emitted by light source assembly 264. The index of refraction and thickness 301 of optical element 300 are selected to direct an incoming beam 310 from a point 320 on a receiving surface 305 that is proximate the shadow region 361 to a point 321 on an exit surface 306 that is proximate screen edge 202. Incoming beam 310 may be a monochromatic light beam, such as a laser beam, and as such, may be projected through a region of the panel assembly 250. Incoming beam 310 is directed to point 320 on receiving surface 305 by light source assembly 264 at an incoming ray angle 330 (measured from the normal). Incoming beam 310 is then directed along a second optical path by refraction, i.e., at a refracted ray angle 331, to point 321 on an exit surface 306 as shown, where incoming beam 310 passes between shadow region 361 and exit surface 306. Thus any pixels or image elements disposed in peripheral region 262 are illuminated by normally incident light from light source assembly 264, even though no light beams pass through shadow region 361.

The maximum size of shadow region 361 that can be accommodated by optical element 300 is directly proportional to incoming ray angle 330, ray diameter, and optical element thickness 301, and inversely proportional to the refractive index of optical element 300. Thus, varying these four parameters one may control the position that the light exits the exit surface 306, or point 321. For example, constructing optical element 300 from a material having a different index of refraction changes refracted ray angle 331. Consequently, selection of an appropriate material for optical element 300 facilitates positioning point 321 as close as desired to screen edge 202 for a given size of shadow region 361, and a lower index of refraction allows for a larger shadow region 361. In one embodiment, the index of refraction of materials suitable for use as optical element 300 generally ranges between about 1.45 and 1.70, which is a relatively narrow range. In addition, mechanical and material constraints for optical element 300 may limit what material is used for optical element 300, and therefore what index of refraction optical element 300 may have. Thickness 301 may also be varied in order to control the position of point 321 on the exit surface 306. Unlike index of refraction, thickness 301 can be made as thick as desired to control the position of point 321, and is not limited to a narrow range. In addition, thickness 301 can be controlled with relatively high precision, which facilitates the precise positioning of point 321. Precise positioning of point 321 ensures that pixels or image elements that are disposed in peripheral region 262 proximate screen edge 202 are illuminated by incoming beam 310. An example of image elements that may be positioned proximate screen edge 202 are described below in conjunction with FIGS. 4 and 7. Incoming ray angle 330 is dependent on configuration details of panel assembly 250, including the width of screen 200 and the distance between light source assembly 264 and receiving surface 305, and for different configurations of panel assembly 250 may vary, for example, between about 20° and 30°.

If point 320 is positioned too close to or inside of shadow region 361, some or all of incoming light beam 310 may be incident on the support frame 210, and the desired intensity of optical energy cannot be directed to one or more image elements disposed in the peripheral region 262, producing a noticeably darker region at the periphery of screen 200. Conversely, if point 320 is positioned too far from shadow region 361 and screen edge 200, necessary thickness 301 of optical element 300 may be prohibitively great, resulting in a prohibitively heavy screen 200. It has been found that by controlling the four parameters incoming ray angle 330, thickness 301, ray diameter, and the refractive index of optical element 300, the size and tolerance of shadow region 361 can be reasonably controlled so that it will not interfere with the optical path of incoming beam 310 between points 320, 321. For example, in one embodiment, optical element 300 is a glass substrate or sheet having an index of refraction of 1.54 and incoming ray angle 330 is 30.0°. In such an embodiment, refracted ray angle 331 is 18.9°. Setting thickness 301 of optical element 300 to 4.0 mm means that the maximum size of shadow region 361 is 1.30 mm. Given a beam radius of 0.15 mm and a beam placement tolerance of 0.1 mm indicates that the maximum support frame thickness 309 of support frame 210 that can be accommodated by screen 200 with no risk of incoming beam 310 striking support frame 210 is approximately 1.0 mm. Thus, for an index of refraction of 1.54 and incoming ray angle 330 of 30.0°, the desired ratio of thickness 301 to support frame thickness 309 is approximately 4:1. The desired ratio of thickness 301 to support frame thickness varies as a function of index of refraction and incoming ray angle 330.

Weight and thickness of a display screen, such as screen 200, are important considerations in tiled displays, flat-panel displays, and other display screen applications. For example, if thickness 301 of optical element 300 is too great, the screen 200 may be too heavy to be easily supported. Conversely, if thickness 301 is too small, all image elements disposed in peripheral region 262 of screen 200 may not be illuminated by incoming beam 310, since the shadow region 361 for practical reasons can't be made small enough to allow the incoming beam to reach the image elements at a given maximum ray angle 330. Consequently, screen 200 to be configured to have a minimum thickness and weight. In one embodiment, thickness 301 and the material used to construct optical element 300 are selected to minimize the total weight and/or thickness 307 of screen 200. For example, because the allowable size of support frame thickness 309 is indirectly proportional to the index of refraction of optical element 300, a material having a relatively low index of refraction may be selected for optical element 300 in order to maximize the allowable support frame thickness 309 with a minimum thickness 301 for optical element 300. In one embodiment, the receiving surface 305 and/or exit surface 306 of the optical element 300 are substantially the same size as the viewing surface 201. In one example, the viewing surface 201 and receiving surface 305 and/or exit surface 306 are approximately 500 mm×400 mm in size.

In one embodiment, the optical element 300 is generally flat or planar shaped. In one embodiment, the optical element 300 and the components in the RGB assembly 720 are flat or planar shaped. In yet another embodiment, one or more of the surfaces (e.g., reference numerals 305 and 306) of the optical element 300 are curved, so that light exiting at any point on the optical element 300 is directed in a desirable direction. In one example, the receiving surface 305 and exit surface 306 are concave and convex in shape, respectively.

In another embodiment, screen 200 may include an optical compensation element to control the angle of incidence of incoming beam 310 on the image layer 266. Optical compensation elements include various optical devices that can adjust the direction of the received light, such as layered waveguides, prisms, lenses or other similar devices that can through their geometric shape and/or material properties (e.g., index of refraction) adjust the angle of the light passing there through. In one embodiment, the optical compensation element comprises a Fresnel lens layer 308. A Fresnel lens reduces the amount of material required compared to other optical compensation means, such as a conventional spherical lens, by breaking the lens into a set of concentric annular sections known as Fresnel zones. In each zone, the overall thickness of the lens is decreased, effectively separating the continuous surface of a standard lens into a set of surfaces of the same curvature. A Fresnel lens allows a substantial reduction in thickness, weight, and volume of material when compared to an equivalent spherical lens. Thus, Fresnel lens layer 308 enables control of the angle of incidence of incoming beam 310 on image layer 266 without the thickness and weight associated with a convention spherical lens system. In one embodiment, Fresnel lens layer 308 is configured to direct incoming beam 310 onto image layer 266 with a normal or near-normal angle of incidence. It should be noted that the location of the Fresnel lens layer 308 as shown in FIG. 3C is not intended to be limiting as to the scope of the invention, since the Fresnel lens layer 308 could also be positioned on the receiving surface 305, exit surface 306, and/or one or more surfaces in the RGB assembly 720 without deviating from the basic scope of the invention disclosed herein.

In one embodiment, as illustrated in FIGS. 3A-C, optical element 300 is a single piece of material that has a receiving surface 305 and an exit surface 306. In one configuration, receiving surface 305 and exit surface 306 are substantially parallel to each other. In one example, optical element 300 is substantially planar and is rectangular in shape. Embodiments of the invention also contemplate other configurations of optical element 300 as well. In one embodiment, the periphery of optical element 300 may be circular or irregular in shape, in which case incoming ray angle 330 will vary at different locations along the perimeter of screen 200. In such an embodiment, the allowable support frame thickness 309 may also vary accordingly. Alternatively, support frame thickness 309 may remain constant, and may be determined based on the worst-case geometry, i.e., wherever incoming ray angle 310 is smallest. In this way, support frame 210 is configured so that it will not interfere with the optical path of incoming beam 310 regardless of position on the perimeter of screen 200. For example, when screen 200 is rectangular, incoming ray angle 310 will be different along the top and bottom edges versus along the side edges of screen 200, and thus the thickness 301 and index of refraction of optical element 300 may be selected based on the smallest incoming ray angle 310. In one embodiment, thickness 301 of optical element 300 may vary as required as a function of incoming ray angle 310 and/or desired support frame thickness 309. In yet another embodiment, optical element 300 may be a composite optical element, which includes two or more layers of different materials to diffract light as required to illuminate pixels or image elements disposed in peripheral region 262 of screen 200. In one example, the two or more layers of different materials have different indexes of refraction that are used in combination to control the position of the beam leaving the exit surface 306. In this configuration the optical element will have an index of refraction, or composite index of refraction, that is the average of the index of refractions of each of the two or more layers taken through the optical element.

Figure 4:
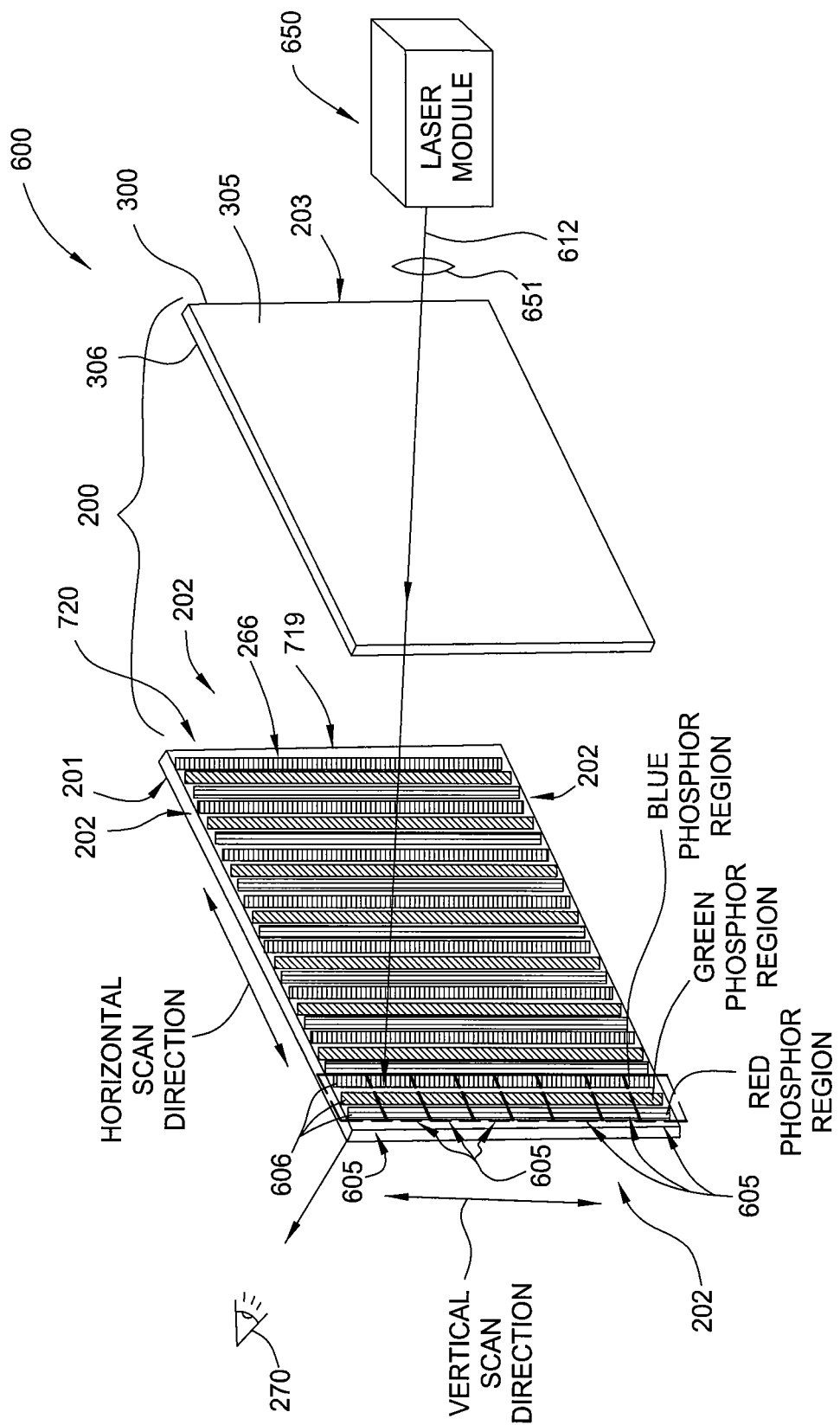
FIG. 4 illustrates one embodiment of a laser-based display system having a plurality of phosphor regions formed in an image layer of a screen.
Figure 5:
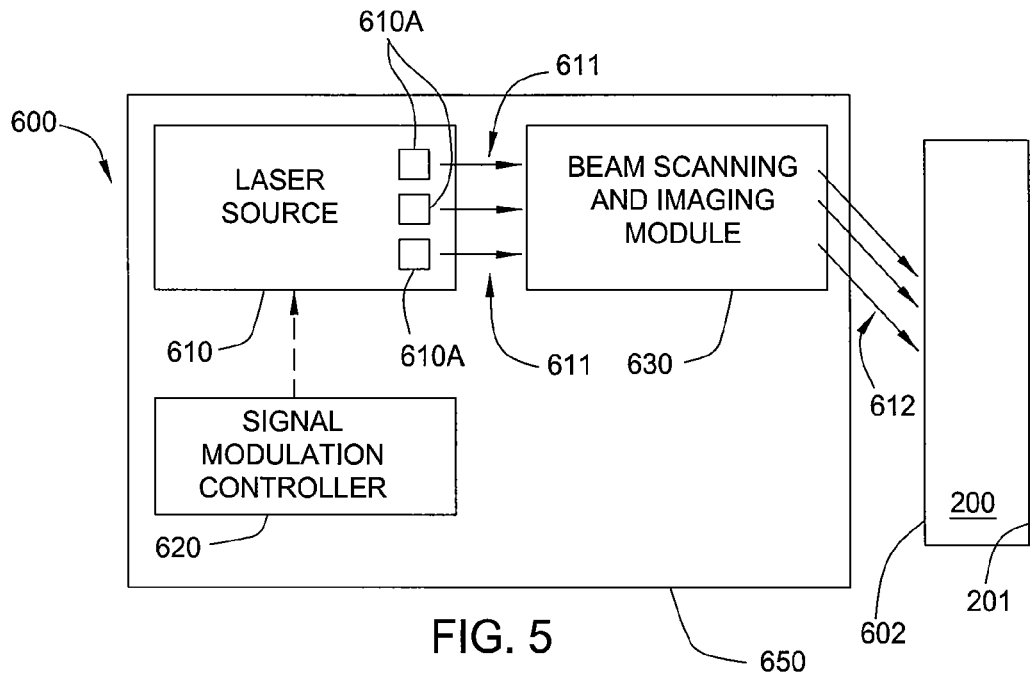
FIG. 5 illustrates an example of an optical modulation design for a laser-based display system that may benefit from embodiments of the invention.

As noted above, in one embodiment, the panel assemblies 250 are laser-based display systems. FIG. 4 is a schematic exploded view that illustrates one embodiment of a laser-based display system 600 having a plurality of phosphor regions, found within an image layer 266, that are formed on image surface 719 of screen 200. As shown, a laser-containing laser module 650 and an audience 270 are positioned on opposite sides of screen 200, i.e., the rear side and the front side of the screen 200, respectively. FIG. 5 illustrates an example of an optical modulation design for a laser-based display system 600 that may benefit from embodiments of the invention, described herein, and which may be incorporated into the enclosure 263 of each of panel assemblies 250. In one embodiment, the laser-based display system 600 generally includes a screen 200 having phosphor regions contained in image layer 266 and a laser module 650. The laser module 650, which may be similarly configured as the light source assembly 264 discussed above, is used to produce a scanning laser beam to excite the phosphor material found in image layer 266 in screen 200. Laser module 650 is adapted to deliver one or more scanning optical beams, or a modulated beam 612, that are scanned along two different directions, for example, the horizontal direction and the vertical direction, in a raster scanning pattern across the image layer 266 of screen 200. In one embodiment, the phosphor regions are parallel regions, or stripes, disposed on an image surface 719 of the screen 200. In one embodiment, each of the phosphor regions comprise a plurality of sub-pixel regions 606, or portions of the stripes. The laser module 650 may be a single mode laser or a multimode laser. The laser may also comprise a single mode along the direction perpendicular to the elongated direction phosphor regions to have a small beam spread that is confined with the width of each phosphor region. Along the elongated direction of the phosphor regions, this laser beam may have multiple modes to spread over a larger area than the beam spread in the direction across the phosphor region. An example of a laser based display system is further described in the commonly assigned U.S. patent application Ser. No. 12/123,418, entitled "Multilayered Screens with Light-Emitting Stripes for Scanning Beam Display Systems," filed May 19, 2008, and now issued as U.S. Pat. No. 8,038,822, which is incorporated herein in its entirety.

In one embodiment, to form an image on screen 200 using a laser-based display system 600 (FIGS. 4-5), a laser source 610 produces a laser beam 611 that is directly modulated to form an image by delivering desired amounts of optical energy to each of the red, green, and/or blue phosphor regions found within multiple image pixel elements 605 formed on image layer 266. Laser module 650 in this implementation includes a signal modulation controller 620, which modulates the output of laser source 610 directly to control the energy delivered to each of the phosphor regions. For example, the signal modulation controller 620 may control the driving current of a laser diode, which is found in the laser source 610. A beam scanning and imaging module 630 then projects modulated beam 612 to screen 200 to excite the color phosphors. Alternatively, laser source 610 is used to generate a CW un-modulated laser beam and an optical modulator (not shown) is used to modulate the generated CW laser beam with the image signals in red, green and blue. In this configuration, a signal modulation controller is used to control the optical modulator. For example, an acousto-optic modulator or an electro-optic modulator may be used as the optical modulator. The modulated beam from the optical modulator is then projected onto screen 200 by the beam scanning and imaging module 630 (FIG. 5). In one embodiment, laser source 610 further comprises two or more lasers 610A that are used in conjunction with other components in laser module 650 to deliver an array of beams to the phosphor regions disposed on image layer 266 formed in screen 200. In one embodiment, each of the lasers 610A is a laser that emits electromagnetic radiation at a wavelength of about 405 nm. In one embodiment, each of the lasers 610A is a laser that is configured to emit radiation at wavelengths between about 180 and about 450 nm. In one embodiment, laser source 610 may include multiple lasers 610A that each emit radiation at a different wavelength, for example red, green, and blue. In such an embodiment, multiple lasers 610A may be scanned across each image pixel element 605 of screen 200, i.e., one laser 610A for each different wavelength emitted.

In operation, modulated beam(s) 612 are scanned spatially across screen 200 to excite the different red, green and blue light generating phosphor regions at different times. Accordingly, the modulated beam 612 carries the image signals for the red, green, and blue for each image pixel at different times and for different image pixel elements 605 at different times. Hence, the modulation of modulated beam 612 is coded with image information for different pixels at different times to map the timely coded image signals in modulated beam 612 to the spatial pixels on screen 200 via the beam scanning. A laser-based display system 600, including laser module 650, laser source 610, signal modulation controller 620, beam scanning and imaging module 630, and an optical modulator, is described in greater detail in patent application Ser. No. 12/123,418, entitled "Multilayered Screens with Light-Emitting Stripes for Scanning Beam Display Systems," filed May 19, 2008, and now issued as U.S. Pat. No. 8,038,822 which is incorporated herein in its entirety.

FIG. 4 further illustrates the structure of an image region, or image pixel element 605. Each image pixel elements 605 outputs light for forming and delivering images to the viewing surface 201 of the screen 200 by the optical emission of visible light created by the laser excitation of the phosphor-containing regions (e.g., each sub-pixel region 606). An array of image pixel elements 605 is used to form the image at viewing surface 201 by individually controlling the composite color and image intensity at each image pixel element's location. In the illustrated example, the dimension of the pixel region is defined by the physical width of the three color regions (e.g., width 751 in FIG. 7), or stripes, in one dimension (e.g., the horizontal scan direction perpendicular to the color stripes) and the control of the beam spot size for a particular image information in the other dimension without a physical boundary of the pixel region (e.g., the vertical direction parallel to the color phosphor stripes). It should be noted that the beam spot size, or cross sectional area, may also be affected by the angular position of the laser-emitted radiation relative to image layer 266. In other implementations, both dimensions of image pixel element 605 may be defined by physical boundaries. Each pixel region 605 includes three sub-pixel regions 606, which emit light in three different colors, such as red, green and blue. In each image pixel element 605, the respective portions of the three parallel light emitting regions are optically active regions that emit visible light and any unwanted space between the light-emitting stripes is filled with a non-light-emitting material forming a divider located between the light-emitting stripes. In one example, each of sub-pixel regions 606 are spaced at about a 500 to about 550 μm pitch. In one example, each of sub-pixel regions 606 are spaced at a pitch between about 125 μm and about 1000 μm. In general, it is desirable to form the image pixel elements 605 proximate, i.e., as close as practicable, to screen edges 202 to minimize gap 103 formed between images in adjacent panel assemblies 250. In one embodiment, the displacement between a sub-pixel region 606 and a screen edge 202 may be no more than 15% of the width of the sub-pixel region 606. In one example, a sub-pixel 606 may be approximately 500 μm wide and positioned within approximately 80 μm of screen edge 202. In one embodiment, the beam spot size is non-circular in shape so that the cross section of the beam is not uniformly circular. As an example, the beam's shape may be longer in one axis than another. In one configuration, the beam spot size is longer in a direction parallel to the long direction of each of the three sub-pixel regions 606 (vertical scan direction in FIG. 4) versus a direction perpendicular to the three sub-pixel regions 606 (horizontal scan direction in FIG. 4).

In one embodiment, as shown in FIG. 2, each of the two or more panel assemblies 250 are positioned on display frame 261 to form a tiled display device that has small gaps 103 between the illuminated regions formed in each panel assembly. It is believed that significant visible lines will be perceptibly reduced between each of panel assemblies 250 when gap 103 between is maintained at a distance that is substantially smaller than the width of a pixel found in panel assemblies 250.

Figure 6:
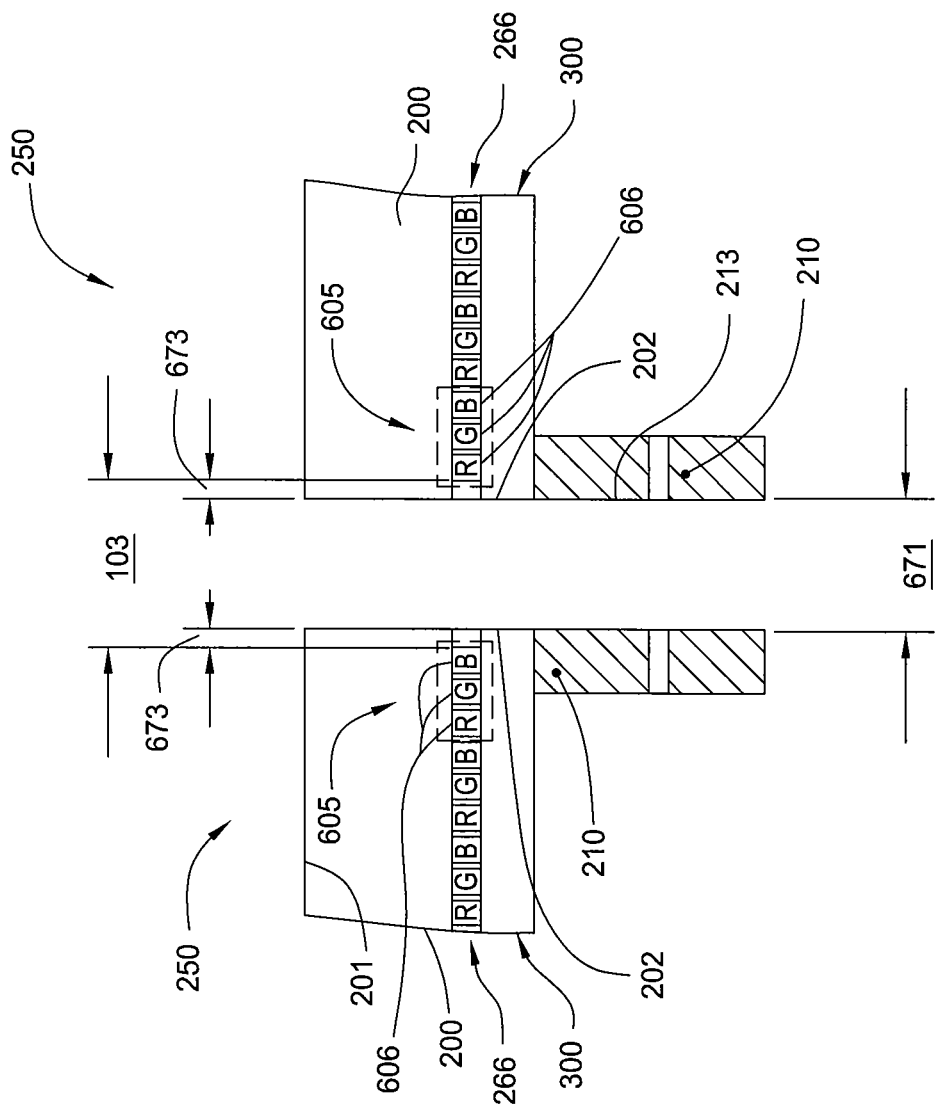
FIG. 6 is a side cross-sectional view that illustrates the alignment and configuration of a gap formed between two adjacent panel assemblies positioned in a display screen assembly.

FIG. 6 is a side cross-sectional view that illustrates the alignment and configuration of the gap 103 formed between two adjacent panel assemblies 250 positioned in a display screen assembly 260. As discussed above, gap 103 is generally defined as spacing between the images formed in adjacent panel assemblies 250. In general, the gap 103 is defined as the distance between the sub-pixel regions 606 in each of the image pixel elements 605 nearest the screen edge 202 and/or frame edge 213 of adjacent panel assemblies 250. In one embodiment, gap 103 is equal to the spacing between the screen edges 202 of adjacent panel assemblies 250 (e.g., edge gap 671) plus the distance between the screen edge 202 and the edge of the image pixel element 605 nearest the screen edge 202 in each of the adjacent panel assemblies 250 (e.g., two times a pixel gap 673). In one example, the edge of the sub-pixel region 606 closest to the screen edge 202, or pixel gap 673, is between about 0 and about 25 µm from the screen edge 202 measured along the image layer 266, where when the pixel gap 673 is equal to zero the subpixel is at the edge of the screen. In another example, the pixel gap 673 is no more than a sub-pixel width. In one embodiment, due to the desirable placement of the pixel elements 605 at the screen edge 202, the gap 103 is substantially equivalent to the spacing between the adjacent screen edges 202, or equal to the edge gap 671. While FIG. 6 illustrates a gap 103 configuration that comprises an edge gap 671, which is formed between the adjacent panel assemblies 250, this configuration is not intended as to limiting to the scope of the invention described herein, since it is generally desirable to not form an edge gap 671 to reduce the spacing between the adjacent projected images. Due to tolerance and alignment issues between the adjacent panel assemblies 250, a small edge gap 671 may exist. However, in some cases it is desirable to try to minimize the size of edge gap 671 as much as possible.

Figure 7:
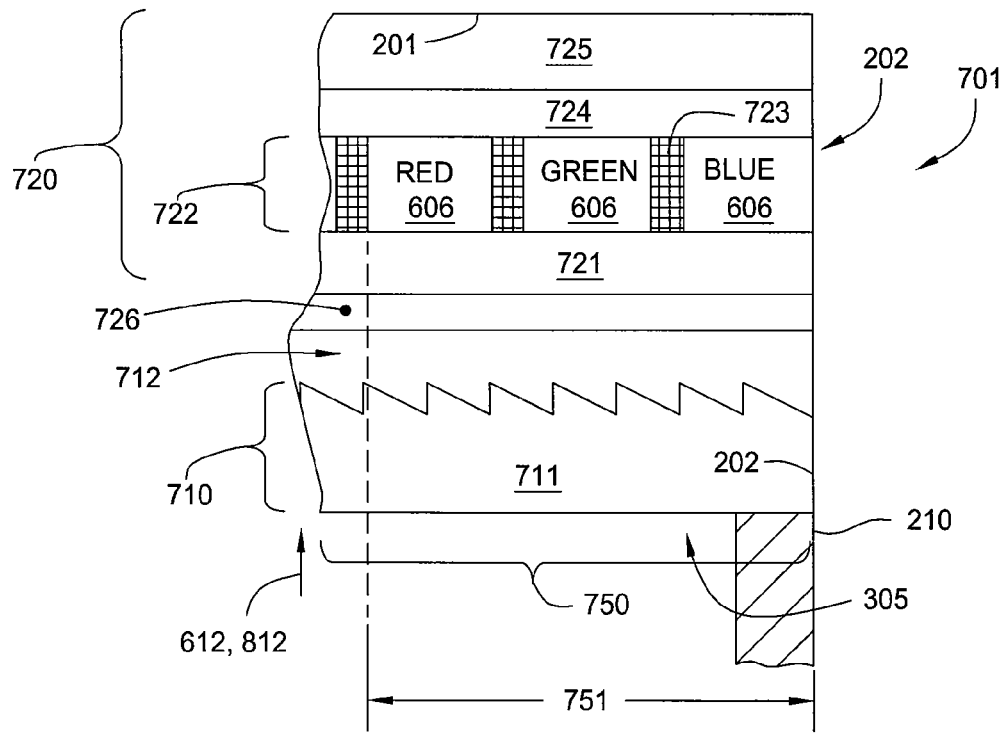
FIG. 7 is a partial schematic side view of one embodiment of a screen of a laser-based display system, according to one embodiment of the invention.

FIG. 7 is a partial schematic side view of one embodiment of a screen 200 of a laser-based display system 600. In one embodiment, screen 200 includes two subassemblies: a Fresnel lens assembly 710 and an RGB assembly 720. In one embodiment, screen 200 includes the components described herein in conjunction with the screen 701. Fresnel lens assembly 710 includes a Fresnel lens layer 711 formed adjacent to the beam entry side (e.g., receiving surface 305) of the image layer 266 of the screen and an optical layer portion that is substantially similar to optical layer 300, described above. In one embodiment, the Fresnel lens is formed in a dielectric substrate that may be made of, e.g., a glass or a plastic material. A gap 712, or an optical material with a different index of refraction than Fresnel lens layer 711, may be used to create a difference in the refractive index from the Fresnel lens to the next layer of the screen, i.e., RGB assembly 720. Typically, due to the need for gap 712, the Fresnel lens assembly 710 and RGB assembly 720 are not held together as a single screen assembly with an adhesive or other material. Other layers may also be formed in Fresnel lens assembly 710, such as an antireflection layer at the entrance surface of Fresnel lens assembly 710 for receiving the excitation laser light. RGB assembly 720 includes a transparent substrate 721, an RGB layer 722 with black pixel-separating matrix 723, an encapsulation layer 724, and a viewer layer 725, which may act as a UV blocking layer. In one embodiment, the RGB layer 722 is formed on or is coupled to a transparent substrate 721, which has a low coefficient of thermal expansion. A low coefficient of thermal expansion minimizes the change in position of sub-pixels 606 relative to laser module 650, thereby ensuring accurate and complete illumination of each sub pixel 606 by modulated beam 612. Inaccurate beam placement and/or displacement of sub pixels 606 due to thermal expansion of transparent substrate 721 may result in varying performance of the display at different times, such as the difference in the time of day, seasonal changes, and display start-up versus continual running conditions. The varying performance will generally be caused by the variation in the illumination of sub pixels 606 caused by the movement of the sub-pixel regions 606 relative to the aligned modulated beam 612 position. In one embodiment, it is desirable to form the RGB layer 722 on a transparent low thermal expansion material, such as a glass material versus a plastic material.

The RBG assembly 720 may include other layers as well, such as a dichroitic filter layer, or filter element, that is positioned adjacent to or formed on, or within, the transparent substrate 721, which is on the laser-entry side of RGB assembly 720. In general, the dichroitic filter is adapted to transmit the wavelength(s) of light found in the modulated beam 612 and reflect at least a portion of the visible wavelengths of light emitted by the phosphor layers, which are excited by the modulated beam 612, back towards viewing surface 201 of the RBG assembly 720. In one example, the visible wavelengths of light may be between about 380 and about 750 nanometers. In this way, the brightness of screen 200 can be improved by the delivery of more of the emitted light from the phosphor regions to viewing surface 201. In one embodiment, it is also desirable to assure that the incident angle of modulated beam(s) 612 is substantially perpendicular to the surface of the dichroitic filter, since any internal reflection(s) of the incident modulated beam(s) are less likely to be reflected at angles where the light can make its way to other adjacent regions of RBG assembly 720, and the percentage of reflected light can be reduced.

Figure 1A:
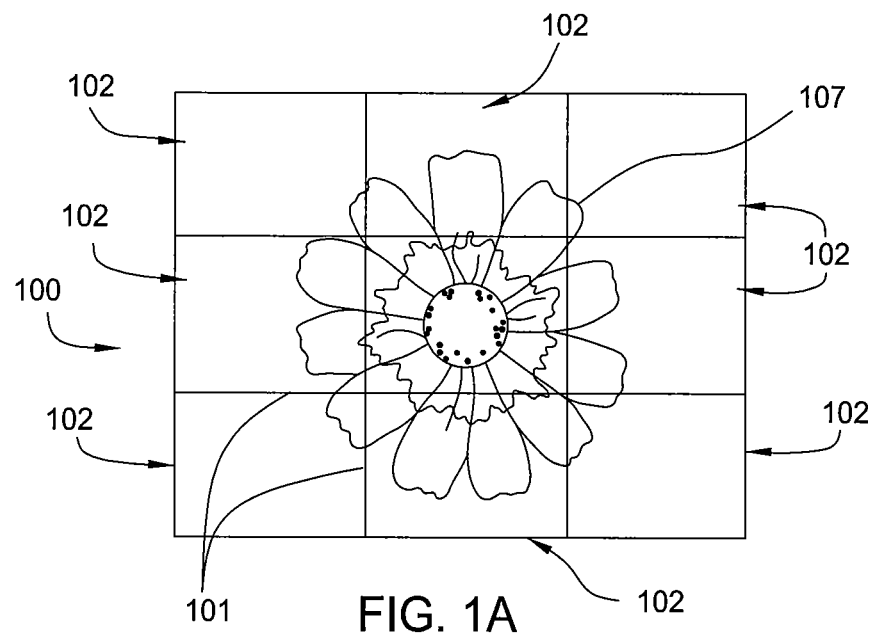
FIG. 1A is a schematic plan view of a tiled display device having a grid pattern that may be visible to the viewer.
Figure 1B:
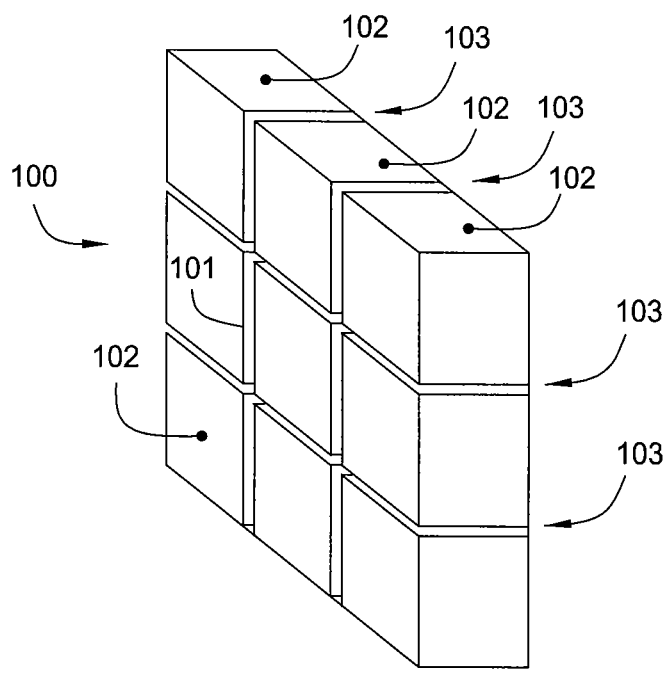
FIG. 1B is a schematic perspective view of a tiled display device having a grid pattern that may be visible to the viewer.

In one embodiment, RGB layer 722 includes a plurality of pixels and subpixels, which are formed within the image layer 266, described above. FIG. 7 depicts a single pixel 750 and the red, green, and blue subpixels associated therewith. Each of subpixels 606 are actually small portions of each of the color phosphor regions, such as a stripe that extends across screen 200 perpendicular to the scanning path of modulated beam 612, as discussed above. In one embodiment, width 751 of pixel 750 is on the order of 1500 (µm) microns, however, in some applications, the width 751 may be significantly smaller. In one embodiment, the diameter of each of the modulated beams 612 is about equal to the width of each sub pixel 606, such as between about 125 µm and about 1000 µm, or between about 125 µm and about 550 µm. However, as discussed above, in some case the cross-sectional area of the modulated beams 612 is the sub pixel 606 width (e.g., horizontal direction in FIG. 4) times the length of the pixel (e.g., vertical length along the phosphor regions as shown in FIG. 4). In general it is important to assure that pixel 750 at the edge is disposed as close to the screen edge 202 to reduce the viewer's ability to see a grid pattern 101, depicted in FIG. 1A. In addition, optical layer 300 and Fresnel lens layer 711, such as contained in the Fresnel lens assembly 710, may be configured to ensure that the modulated beam 612 is correctly aligned and directed to the sub pixels 606 that are positioned proximate screen edge 202, such as the blue sub pixel 606 depicted in FIG. 7. In this way, all pixels 605 and subpixels 606 of screen 200 are illuminated correctly by the modulated beam(s) 612. It should be noted that the correct alignment of modulated beam to each sub-pixel 606 is important to ensure, in the worst case that the correct colors are generated, however, more typically the amount of light stimulation of the phosphor material in each sub-pixel is above a desired level.

Figure 8:
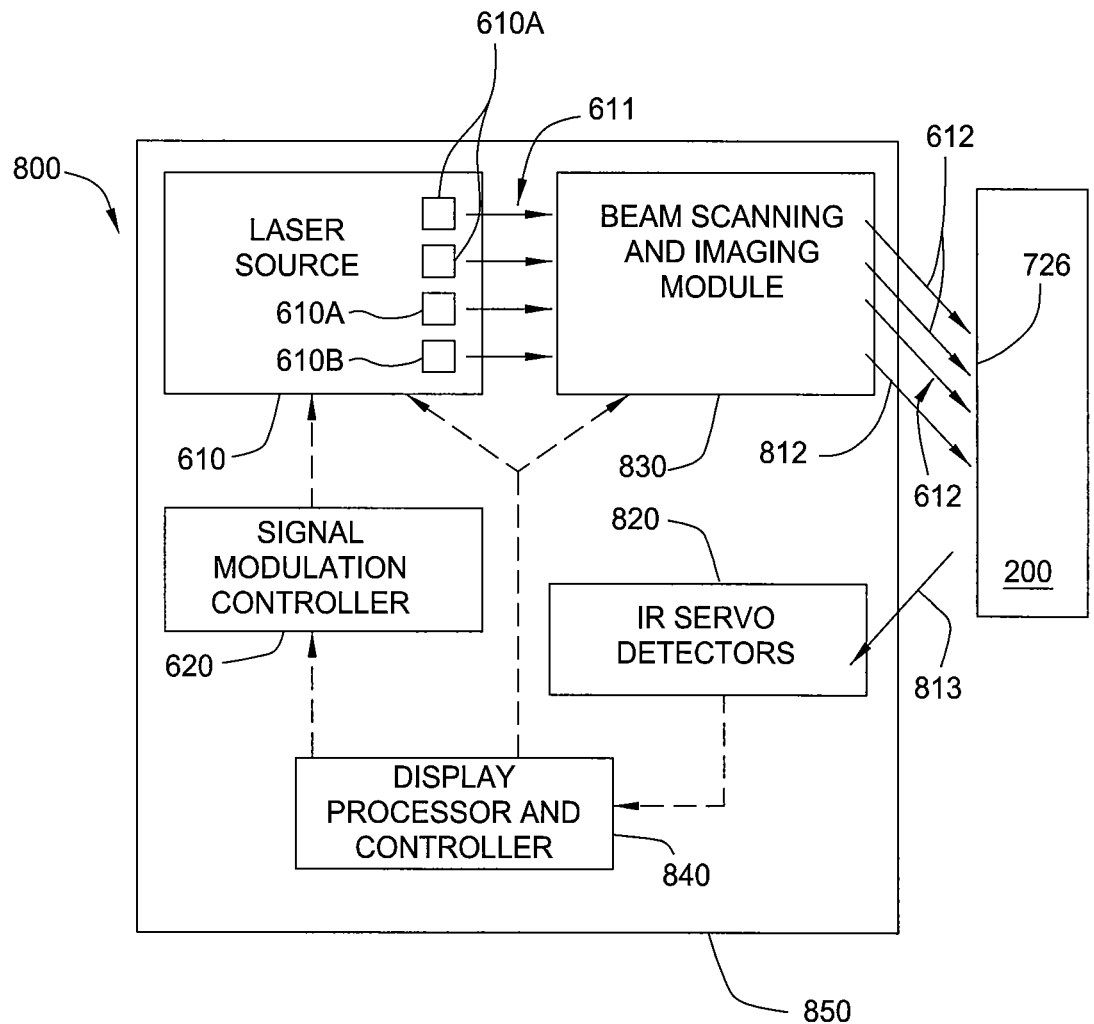
FIG. 8 illustrates one embodiment of a laser-based display system that utilizes a servo feedback system to control the position of a modulated beam, according to embodiments of the invention.

In one embodiment, as schematically illustrated in FIG. 8, transparent substrate 721 includes a patterned reflective layer 726 to provide feedback as part of a closed-loop servo control system that is used to control the position of modulated beam(s) 612 with respect to the subpixels contained in RGB layer 722. Patterned reflective layer 726 may be formed on transparent substrate 721 as reflective alignment marks (see FIG. 9) to reflect a servo beam 812 (FIGS. 8 and 9) delivered from a laser 610B and therefore provide feedback to a servo system controlling the position of the servo beam 812 and modulated beam(s) 612 relative to servo beam 812. The position control is provided, since the servo beam 812 has a known spatial relation to modulated beam(s) 612 delivered from lasers 610A. Therefore, by use of a closed-loop control system that uses the beam scanning and imaging module 630 and display processor and controller 840 (e.g., computer), the position of the servo beam 812 can be used to control the positioning of modulated beam(s) 612. In one embodiment, the modulated beam(s) 612 are delivered through a fixed lens 651 (FIG. 4), or scan lens, that is positioned between the beam scanning and imaging module 630 and the screen 200, and is used to focus the modulated beam(s) 612 to a desired cross-sectional area as received at the receiving surface 305.

FIG. 8 illustrates one embodiment of a laser-based display system 800 that utilizes a servo feedback system to control the position of modulated beams 612 and servo beam 812, according to embodiments of the invention. Laser-based display system 800 is substantially similar to previously described laser-based display system 600, with additional features, detailed herein. Screen 200 includes patterned reflective regions 726A (FIG. 9) formed in patterned reflective layer 726 to provide feedback in the form of reflected light that is collected by one or more IR servo detectors 820. Beam scanning and imaging module 830 is substantially similar to beam scanning and imaging module 630 in FIG. 5, except that a servo beam 812 is also projected thereby to screen 200. Servo beam 812 may be an invisible light beam, such as an IR light beam, delivered from a laser 610B. Reflection of servo beam 812 from patterned reflective layer 726 provides feedback light 813 from screen 200. The feedback light 813 is measured by using one or more IR servo detectors 820 to produce one or more feedback servo signals, which are used to generate a location map for red, green and blue sub-pixels on screen 200. A display processor and controller 840 serves as a servo controller in laser module 850, and processes the received servo signals to extract the information related to beam positioning and other properties of the beam on screen 200 and, in response, adjust the direction and other properties of modulated beam(s) 612 using beam positioning components (e.g., articulated mirrors) in the beam scanning and imaging module 830 to ensure the proper operation of the display system. An example of a laser-based display system that utilizes a servo feedback system is further described in the commonly assigned U.S. patent application Ser. No. 11/769,580, entitled "Servo Feedback Control Based on Invisible Scanning Servo Beam in Scanning Beam Display Systems with Light-Emitting Screens," filed Jun. 27, 2007, and now issued as U.S. Pat. No. 7,878,657, which is incorporated by reference herein in its entirety.

When laser-based display system 800 and servo beam 812 are used to control the position of modulated beam 612 in a panel assembly 250, the angle of incidence of modulated beam 612 and servo beam 812 may be at a "near-normal" angle of incidence to RGB assembly 720 of screen 200 by use of optical element 300 and/or a Fresnel lens layer 308 (e.g., Fresnel lens 711), rather than a normal angle of incidence. A near-normal incident angle, i.e., an incident angle that is less than approximately 10° from normal, facilitates detection of feedback light from screen 200.

Figure 9:
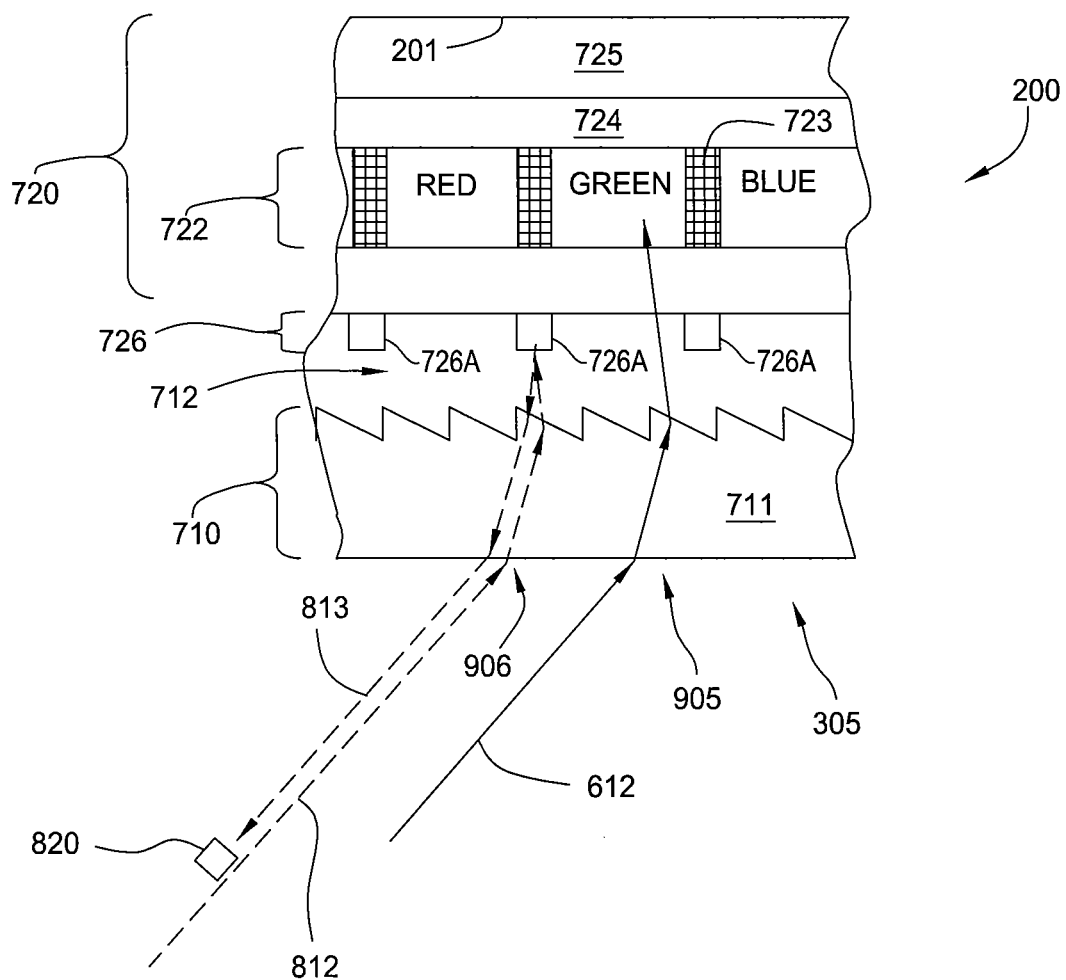
FIG. 9 schematically illustrates near-normal incidence of a modulated beam and a servo beam, according to an embodiment of the invention.

FIG. 9 schematically illustrates optical paths along which modulated beam(s) 612 and servo beam 812 follow from the laser source 610 (not shown in FIG. 9), according to an embodiment of the invention. As shown, modulated beam 612 and servo beam 812 are directed to Fresnel lens assembly 710 of screen 200 along parallel optical paths. In one configuration, a modulated beam 612 and servo beam 812 have a spaced apart relationship so that modulated beam 612 strikes receiving surface 305 of Fresnel lens assembly 710 at a first position 905 and servo beam 812 strikes receiving surface 305 at a second position 906. The incident modulated beam 612 and servo beam 812 are then directed by Fresnel lens assembly 710 to RGB assembly 720, which is positioned adjacent to Fresnel lens assembly 710. In one embodiment, modulated beam 612 and servo beam 812, as noted above, are each significantly different wavelengths of light, e.g., UV (or blue) and IR wavelengths respectively. Fresnel lens assembly 710, which includes optical element 300, is configured to direct incident light, i.e., modulated beam 612 and servo beam 812, to RGB assembly 720 along an optical path having a near-normal angle of incidence to the surface of RGB assembly 720. Thus, when servo beam 812 is incident on a portion of patterned reflective layer 726, servo beam 812 is reflected back along a slightly different path, as shown (e.g., feedback light 813). In this way, the return path of servo beam 812 accommodates the physical offset between the light source for servo beam 812, i.e., beam scanning and imaging module 830, and the servo detector, i.e., IR servo detectors 820. The physical offset, as well as other configuration details of a panel assembly, determine how far from normal incidence is required to facilitate the use of a servo detector and servo beam 812. In one embodiment, the near-normal angle of incidence of modulated beam(s) 612 and servo beam 812 to the surface of RGB assembly 720 is less than approximately 10°.

As noted above, the wavelength of light used for servo beam 812 may be substantially different than the wavelength of light used for modulated beam 612. Because the index of refraction of a material varies as a function of wavelength, one of skill in the art will appreciate that the selection of thickness 301 of optical element 300 (illustrated in FIG. 3C) and the index of refraction of optical element 300 should be based on the worst case wavelength and light beam position to ensure that a support frame will not interfere with either servo beam 812 or modulated beam 612.

While the foregoing is directed to embodiments of the present invention, other and further embodiments of the invention may be devised without departing from the basic scope thereof, and the scope thereof is determined by the claims that follow.

I claim:

1. A display screen, comprising:
    a screen assembly comprising an optical element having a first surface, a second surface, a first edge and an index of refraction;
    a monochromatic light source assembly that is positioned to direct a first light beam delivered from a first light beam source to a first position on and at a first angle of incidence to the first surface; and a support frame having a support surface that is disposed over a shadow region on the first surface of the optical element, wherein a portion of the shadow region is disposed between the first position and the first edge of the optical element, wherein the index of refraction and the thickness of the optical element between the first and second surfaces are selected to direct the first light beam from the first position to a second position on the second surface of the optical element, and a portion of the first light beam passing through the optical element between the first position and the second position passes under at least a portion of the shadow region.

2. The display screen of claim 1, wherein the thickness of the optical element formed between the first and second surfaces is 3 to 5 times a width of the support surface of the support frame measured along the direction parallel to the first surface between the first edge and the first position.

3. The display screen of claim 1, wherein the index of refraction of the optical element is about 1.5 and a distance between the first surface and the second surface is between 3 mm and 5 mm.

4. The display screen of claim 1, wherein the second surface of the screen assembly further comprises an optical compensation element.

5. The display screen of claim 4, wherein the optical compensation element comprises a Fresnel lens.

6. The display screen of claim 1, wherein the first light beam exits the second surface of the optical element in a first direction that is different than the direction of the first light beam that is delivered to the first position, wherein the first position is proximate to the portion of the shadow region.

7. The display screen of claim 1, wherein the first light beam exits the second surface in a direction that is substantially perpendicular to an image surface that has a phosphor containing layer disposed thereon.

8. The display screen of claim 1, wherein the screen assembly further comprises an image element having an image surface disposed proximate to the second surface, wherein the image element further comprises a light-emitting layer that is disposed on the image surface, and wherein the light-emitting layer comprises light-emitting regions that are each adapted to absorb the energy delivered in the first light beam at a first wavelength and emit visible light at a second wavelength, different from the first wavelength, to a viewing surface formed on the image element.

9. The display screen of claim 1, wherein the screen assembly further comprises a filter element that is configured to substantially transmit the electromagnetic radiation delivered from the monochromatic light source and reflect at least one or more visible wavelengths of light.

10. The display screen of claim 1, wherein the second position is selected so that the first light beam is directed to at least a portion of a phosphor-containing region positioned proximate to the first edge of the screen assembly.

11. The display screen of claim 10, wherein proximate to the first edge comprises being disposed less than the width of a sub-pixel region from the first edge of the screen assembly.

12. The display screen of claim 1, wherein
the light source assembly further comprises a second light beam source that is configured to deliver a second light beam to a third position on the first surface so that at least a portion of the second light beam exits the optical element at a fourth position on the second surface, the second light beam having a different wavelength than the first light beam, and the screen assembly further comprising a reflective surface that is positioned to receive at least a portion of the second light beam exiting the second surface at the fourth position and reflect the portion of the second light beam back to the second surface.

13. The display screen of claim 12, further comprising:
a detector disposed over the first surface of the optical element, wherein the detector is positioned to receive the portion of the second light beam reflected back to the second surface.

14. The display screen of claim 1, wherein the index of refraction is between about 1.45 and 1.70.

15. The display screen of claim 1, wherein the light source comprises a fixed lens and an optical scanning mechanism configured to direct light through the fixed lens to two or more positions on the first surface.

16. The display screen of claim 1, wherein
the optical element further comprises a second edge that is opposite the first edge,
the light source assembly further comprises a beam scanning device that is adapted to translate the first light beam across the first surface from the first position to a third position on the first surface, wherein third position is positioned so that at least a portion of the first light beam exits the optical element at a fourth position on the second surface,
the support frame further comprising a portion of the support surface that is disposed between the third position and the second edge and over the first surface of the optical element to form another shadow region on the first surface, and
wherein a portion of the first light beam passing through the optical element between the third position and the fourth position passes under at least a portion of the another shadow region.

17. The display screen of claim 1, wherein the monochromatic light source assembly comprises a plurality of lasers that each emit radiation at a different wavelength.

18. A display screen, comprising:
a screen assembly comprising an optical element having a first surface, a second surface, a first edge and an index of refraction;
a light source assembly that is positioned to direct a first light beam delivered from a first light beam source to a first position on and at a first angle of incidence to the first surface;
a support frame having a support surface that is disposed over a shadow region on the first surface of the optical element, wherein a portion of the shadow region is disposed between the first position and the first edge of the optical element, and wherein the support frame prevents light from the light source assembly from passing through the shadow region; and
an image element having a light-emitting layer that is disposed on an image surface, wherein the image surface is disposed proximate the second surface,
wherein the index of refraction and the thickness of the optical element between the first and second surfaces are selected to direct the first light beam from the first position to a second position on the second surface of the optical element, and wherein the first light beam exiting the second surface at the second position illuminates a portion of the light-emitting layer disposed proximate the first edge.

19. The display screen of claim 18, wherein the light-emitting layer comprises a phosphor-containing layer.

20. The display screen of claim 19, wherein the phosphor-containing layer comprises a plurality of sub-pixel regions and wherein proximate comprises being disposed less than the width of a sub-pixel region from the first edge of the screen assembly.

21. The display screen of claim 18, wherein
the optical element further comprises a second edge that is opposite the first edge,
the light source assembly further comprises a beam scanning device that is adapted to translate the first light beam across the first surface from the first position to a third position on the first surface, wherein the third position is positioned so that at least a portion of the first light beam exits the optical element at a fourth position on the second surface,
the image element further comprising a portion of the light-emitting layer that is disposed on the image surface adjacent to the second edge, and
wherein the first light beam exiting the second surface at the fourth position illuminates the portion of the light-emitting layer disposed adjacent to the second edge.

22. The display screen of claim 18, wherein
the light source assembly further comprises a second light beam source that is configured to deliver a second light beam to a third position on the first surface so that at least a portion of the second light beam exits the optical element at a fourth position on the second surface, the second light beam having a different wavelength than the first light beam, and
the screen assembly further comprising a reflective surface that is positioned to receive at least a portion of the second light beam exiting the second surface at the fourth position and reflect the portion of the second light beam back to the second surface.

23. The display screen of claim 22, further comprising:
a detector disposed over the first surface of the optical element, wherein the detector is positioned to receive the portion of the second light beam reflected back to the second surface.

24. The display screen of claim 1, wherein the support frame prevents light from the monochromatic light source assembly from passing through the shadow region.

* * * * *